(12) United States Patent
Wu et al.

(10) Patent No.: US 8,258,767 B2
(45) Date of Patent: Sep. 4, 2012

(54) POWER CONVERSION SYSTEM AND POWER CONTROL METHOD FOR REDUCING CROSS REGULATION EFFECT

(75) Inventors: Jean-shin Wu, Taipei (TW); Ke-Horng Chen, Taipei (TW)

(73) Assignee: Alpha & Omega Semiconductor, Inc., Sunnyvale, CA (US)

( * ) Notice: Subject to any disclaimer, the term of this patent is extended or adjusted under 35 U.S.C. 154(b) by 323 days.

(21) Appl. No.: 12/772,112

(22) Filed: Apr. 30, 2010

(65) Prior Publication Data
US 2011/0169468 A1 Jul. 14, 2011

Related U.S. Application Data

(63) Continuation-in-part of application No. 12/686,587, filed on Jan. 13, 2010.

(51) Int. Cl.
G05F 1/656 (2006.01)
G05F 1/652 (2006.01)

(52) U.S. Cl. ........ 323/282; 323/222; 323/284; 323/285; 323/286; 323/349; 323/351

(58) Field of Classification Search .................. 323/222, 323/282, 284, 285, 286, 349, 351
See application file for complete search history.

(56) References Cited

U.S. PATENT DOCUMENTS

| | | | | |
|---|---|---|---|---|
| 6,057,607 | A * | 5/2000 | Rader et al. | 307/11 |
| 6,239,509 | B1 * | 5/2001 | Rader et al. | 307/11 |
| 6,304,066 | B1 * | 10/2001 | Wilcox et al. | 323/282 |
| 6,476,589 | B2 * | 11/2002 | Umminger et al. | 323/282 |
| 6,906,499 | B2 * | 6/2005 | Hussein et al. | 323/222 |

* cited by examiner

*Primary Examiner* — Bao Q Vu
(74) *Attorney, Agent, or Firm* — Chein-Hwa Tsao; CH Emily LLC

(57) ABSTRACT

A power conversion system and power control method for reducing cross regulation effect uses a voltage feedback adjustment circuit to modulate an error signal fed back from an output voltage so as to predict the energy of an output corresponding to its load states. While the energy delivered to an output terminal with its load remaining the same does not change, the energy delivered to an output terminal with its load changing is adjusted accordingly. The power conversion system thus effectively reduces the cross regulation effect and obtains excellent steady system output and transient response.

17 Claims, 4 Drawing Sheets

POWER CONVERSION SYSTEM AND POWER CONTROL METHOD FOR REDUCING CROSS REGULATION EFFECT

This application is a Continuation in Part of previously filed U.S. application Ser. No. 12/686,587, filed on Jan. 13, 2010, the disclosure of which is incorporated hereto by reference in its entirety.

FIELD OF INVENTION

The invention relates to a power conversion system, in particular to a power conversion system and power control method for reducing cross regulation effect in a single-inductor multi-output DC/DC converter.

BACKGROUND TECHNOLOGIES

Nowadays semiconductor power management chips are broadly applied to portable electronic products like mobile phones, PDAs, notebook computers, etc. In a development trend of system on chips the framework of single-inductor multi-output DC/DC converter is adopted in order to reduce the chip size. However, the multi-output framework has problems of poor stability and cross regulation effect.

Traditionally, multi-outputs are mutually separated such that the output terminals are not interfered by the change of other loads therefore solving the problem of cross regulation effect. A Pseudo-CCM current technology may be used and the whole system is like in a Discontinue Current Mode (DCM) state, resulting in easy stabilization of the system. Moreover, as the system is provided with zero current equivalent to the DCM, and each switching period is provided with a buffer state, a momentary change of load does not affect next switching period therefore reducing the cross regulation effect. However, a Freewheel stage must be added in during the whole PWM period; as the switch is not conducted ideally, a large amount of power can be consumed by the equivalent resistance of switching in this stage; therefore, the Conduction Loss of the whole system can be increased, thereby reducing the efficiency of conversion. Besides, the energy stored in the inductor during the Freewheel stage can not be transferred to the output terminal and the average inductor current is more than the sum of the output loads. A larger average inductor current can cause a larger output voltage ripple due to the discontinuous characteristic of the output inductor current of the single-inductor multi-output module framework; therefore, a high-efficiency post-voltage stabilization circuit is needed to further process the output voltage.

Another method refers to adopt a priority energy distribution flow. However, this method is only applicable to a certain specific load sate; moreover, the method uses a comparator to control the output voltage and does not provide a satisfactory overall voltage stabilization effect compared with the effect of a close loop which adopts an error amplifier to control.

Besides, a framework combining the inductor and a Charge Pump can be used. However, the framework shall additionally use an external capacitance and a diode, and can have a larger output voltage ripple. Moreover, as the negative-voltage output is achieved by the Charge Pump, the negative-voltage output can have a poor voltage stabilizing situation and is quite undesirable in actual application.

In light of the above technical difficulties, this invention provides a power conversion system and power control method for reducing cross regulation effect to resolve the above difficulty by simultaneously combining the electronic and circuit technologies and energy control concept.

SUMMARY OF INVENTION

The invention mainly aims at providing a power conversion system and power control method for reducing cross regulation effect, which uses a voltage feedback adjustment circuit to modulate an error signal so as to effectively eliminate the cross regulation effect and achieving a stable multiple output power.

The invention also aims at providing a power conversion system and power control method for reducing cross regulation effect, which predicts a change in energy of an output voltage corresponding to a variation of the load state of that output voltage terminal so as to quickly adjust the duty cycle of the system providing the system with excellent output stability and transient response as well as improved power conversion efficiency.

The invention further aims at providing a power conversion system and power control method for reducing cross regulation effect that can be integrated into various power management modules for broad range of applications.

In order to achieve the above aims, the invention provides a power conversion system for reducing cross regulation effect, which comprises a switching circuit, a current detector, a plurality of error amplifiers, a voltage feedback adjustment circuit, a peak generator, a comparator unit and a control circuit. The switching circuit is electrically connected with at least one inductor; the inductor is controlled to charge and discharge by the on and off of the switching circuit so as to provide a plurality of output voltages; the current detector detects an inductor current passing through the inductor to measure an inductor voltage. Moreover, the error amplifiers receive a plurality of output voltages and calculate a corresponding error signal for each of the voltages. The voltage feedback adjustment circuit receives and modulates the error signals and generates a plurality of error modulating signals corresponding to a plurality of energies needed by the plurality of out put voltage terminals. The error modulating signals are received by the peak generator to predict a total energy demanded by the system by generating a peak voltage equaled to a peak inductor voltage corresponding to the inductor being charged to store the predicted total energy demanded by the system in next charging period. In addition, the comparator unit respectively compares the inductor voltage with the error modulating signals, the peak voltage and the inductor voltage to generate a plurality of voltage signals received by the control circuit to generate a plurality of control signals used to control the switching circuit for the inductor to be charged and discharged, thus changing the cycle duties of the system to deliver the right amount of energies to all the out put terminals.

The invention provides a power conversion method for reducing cross regulation effect, which comprises the steps of: calculating a separate error signal of each of a plurality of output voltages according to a load state of each output voltages; modulating each error signal, calculating an energy of each of the output voltages required by the load state, and generating a plurality of error modulating signals; calculating a peak voltage according to the error modulating signals and calculating a total energy of the charging and discharging cycle through the peak voltage to make the total energy of the charging cycle to be the total energy needed by the system and make the total energy of the discharging cycle to be a total energy of all the output voltages; and finally charging at least an inductor, which stores the total energy of the charging cycle, according to the peak voltage.

The aims, technical contents, characteristics and achieved effects of the invention are better understood through the detailed description of embodiment and corresponding drawings.

DETAIL DESCRIPTION OF INVENTION

The invention provides a power conversion system and power control method for reducing cross regulation effect, which uses feedback control to predict the energy of the output voltage when the load state of an output terminal is changed such that the system is capable of adjusting the duty cycle according to the load state change and quickly reaching a steady state therefore reduce the generation of Cross regulation effect. The technical characteristics of the invention are described by preferred embodiments as follows.

Figure 1:
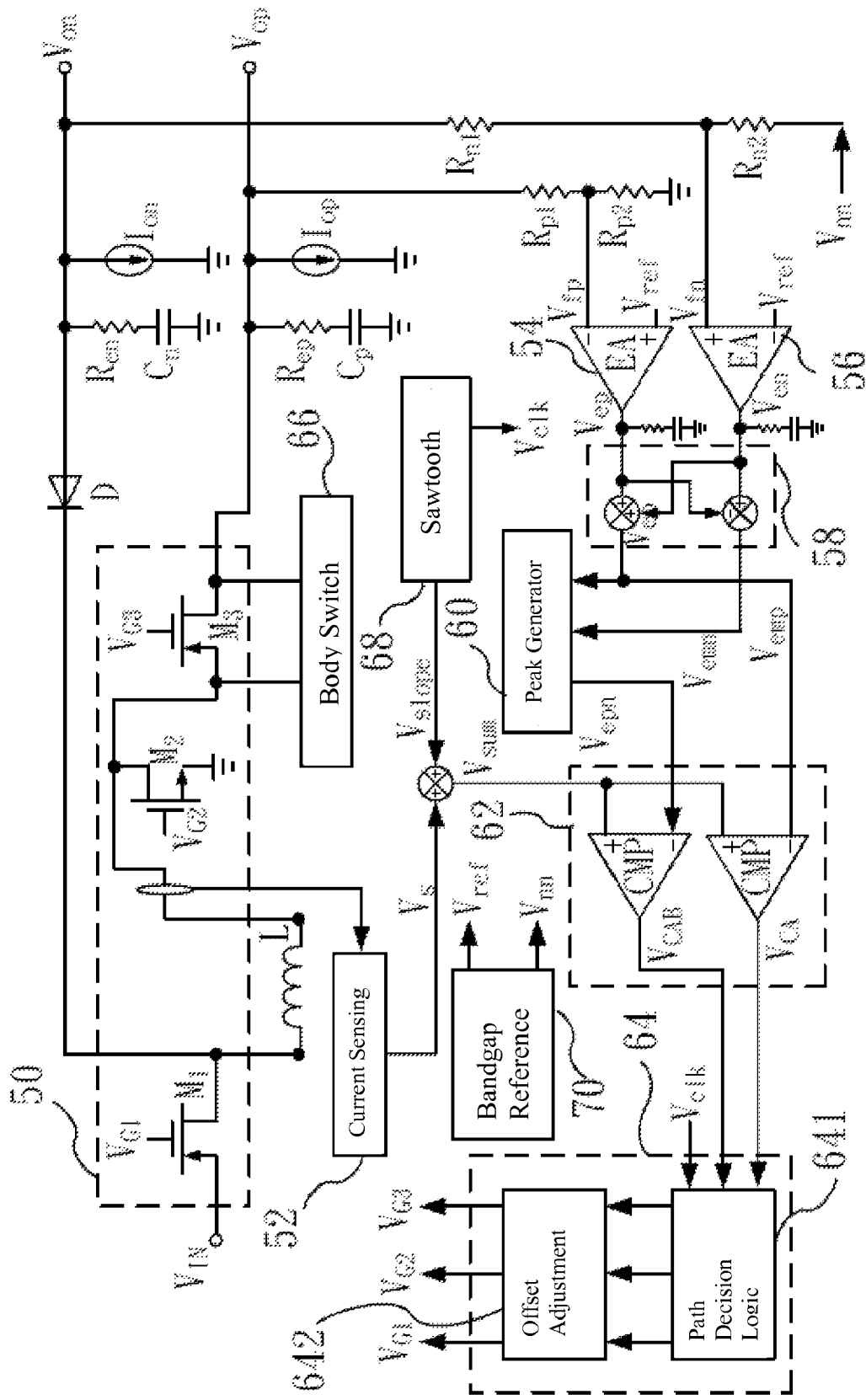
FIG. 1 is a schematic diagram of the circuit framework of the invention.

FIG. 1 is a schematic diagram of circuit framework of the invention; as shown in the diagram, a switching circuit 50 is electrically connected with at least one inductor L. The switching circuit 50 comprises a plurality of switching transistors M1, M2 and M3; the inductor L is controlled to be charged and discharged through turning on and off the switching transistors M1, M2 and M3 so as to output a positive output voltage (Vop) and a negative output voltage (Von). An inductor current passing through the inductor L is detected by a current detector 52 for sensing and providing an inductor voltage (Vs) of the inductor L.

The positive output voltage Vop and the negative output voltage Von respectively generates feedback voltages Vfp and Vfn through dividing resistors Rp1, Rp2 and Rn1, Rn2. The feed back voltages are fed to error amplifiers (EA) 54 and 56 which base on a reference voltage (Vref) generating a positive output voltage error signal (Vep) and a negative output voltage error signal (Ven).

The positive output voltage error signal (Vep) and the negative output voltage error signal (Ven) are received by a voltage feedback adjustment circuit 58 electrically connected with the error amplifiers (EA) 54 and 56. The positive output voltage error signal (Vep) and the negative output voltage error signal (Ven) are mutually cross fed back to generate output voltage error modulating signals, namely, the positive output voltage error signal (Vep) is modulated by the negative output voltage error signal (Ven) to generate a positive output voltage error modulating signal (Vemp); the negative output voltage error signal (Ven) is modulated by the positive output voltage error signal (Ven) to generate a negative output voltage error modulating signal (Vemn).

The positive output voltage error modulating signal (Vemp) and the negative output voltage error modulating signal (Vemn) are inputted to a peak generator 60 electrically connected to the voltage feedback adjustment circuit 58 to generate a peak signal such as peak voltage (Vepn) through the positive output voltage error modulating signal (Vemp) and the negative output voltage error modulating signal (Vemn). The peak voltage is the maximum inductor voltage in a charging cycle of the inductor L. Alternatively a peak current may be generated by the peak generator 60 as a current limit in charging the inductor L. It has be established in co-pending application Ser. No. 12/686,587, the disclosure of which is incorporated by reference hereto in its entirety, that such peak signal can be generated corresponding to the total energy demand of the system, which is the sum of each output voltage energy.

A comparator unit (CMP) 62 is electrically connected with a current detector 52, the voltage adjustment circuit 58 and the peak generator 60 to receive an inductor voltage (Vs), the peak voltage (Vepn) and the positive output voltage error modulating signal (Vemp), and respectively compare the peak voltage (Vepn) and the positive output voltage error modulating signal (Vemp) with the inductor voltage (Vs) to generate a plurality of voltage signals (VCAB) and (VCA). The voltage signals (VCAB) and (VCA) are transmitted to a control circuit 64. The control circuit 64 comprises a path decision logic 641 and a offset adjustment circuit 642; the path decision logic 641 receives the voltage signals (VCAB) and (VCA) as well as a system clock signal (Vclk), to control the offset adjustment circuit 642 to generate control signals VG1, VG2 and VG3 that respectively turns the switching transistors M1, M2 and M3 on and off to control the inductor L to be charged and discharged.

Besides, a slope equalizer 68 is electrically connected to the current detector 52 to compensate a second harmonic generation due to the inductor current alteration and to generate the system needed clock signal (Vclk). The reference voltage (Vref) and a differential voltage (Vnn) for the generation of the negative feedback voltage Vfn may be generated by a band gap reference circuit 70. A body switch circuit 66 may further be connected to the switching transistor M3 of the switching circuit 50 to prevent body effect. In addition, the voltage feedback adjustment circuit 58 can be integrated with the error amplifiers (EA) 54 and 56.

The above is a detailed description of the circuit system framework of the invention and the power control method of the invention is further described below.

Figure 2:
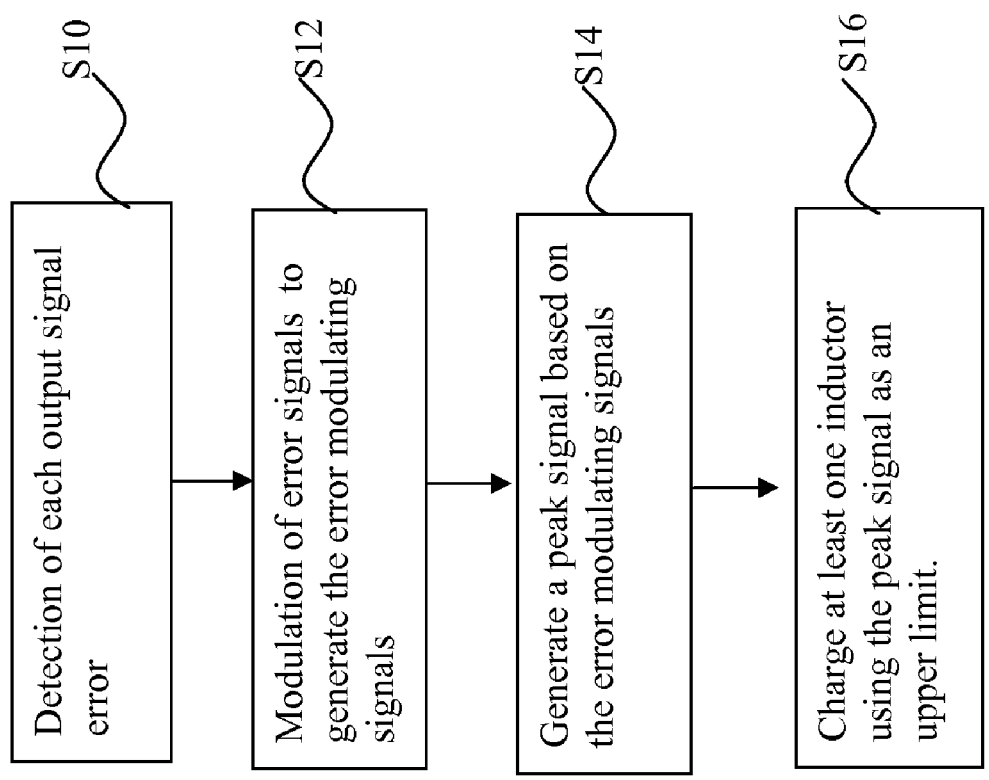
FIG. 2 is a process flow of the power control of the invention.

FIG. 2 is the flow for the power control of the invention as shown in FIG. 11n step S10 the error amplifiers (EA) 54 and 56 calculate the error signals (Vep) and (Ven) according to the feedback voltages (Vfp) and (Vfn) fed back by the load state of the output voltages (Vop) and (Von).

Then in step S12, the voltage feedback adjustment circuit 58 modulates the error signals (Vep) and (Ven) to generate the error modulating signals (Vemp) and (Vemn) so as to maintain the energy of the output voltage to be consistent with the load state.

Next in step S14, the peak generator 60 calculates the peak signal such as peak voltage (Vepn) according to the error modulating signals (Vemp) and (Vemn), and calculates the total energy of the charging and discharging period through the peak voltage (Vepn). It has be established in co-pending application Ser. No. 12/686,587, the disclosure of which is incorporated by reference hereto in its entirety, that such peak signal can be generated corresponding to the total energy demand of the system, which is the sum of each output voltage energy. The peak voltage (Vepn) is the maximum inductor voltage of the charging period; the total energy of the charging period is the total energy needed by the system and the total energy of the discharging period is the sum of the energy of each output voltage.

Finally as in step S16, the inductor L is charged to the peak voltage (Vepn). The inductor L stores the sum of the energy accumulated in the charging period corresponding to the total energy demand of the system.

The above is a description of the power control method of this invention. The reduction of the cross regulation effect of this invention by predicting the energy change of the output voltage when a load state changes is provided below.

Figure 3:
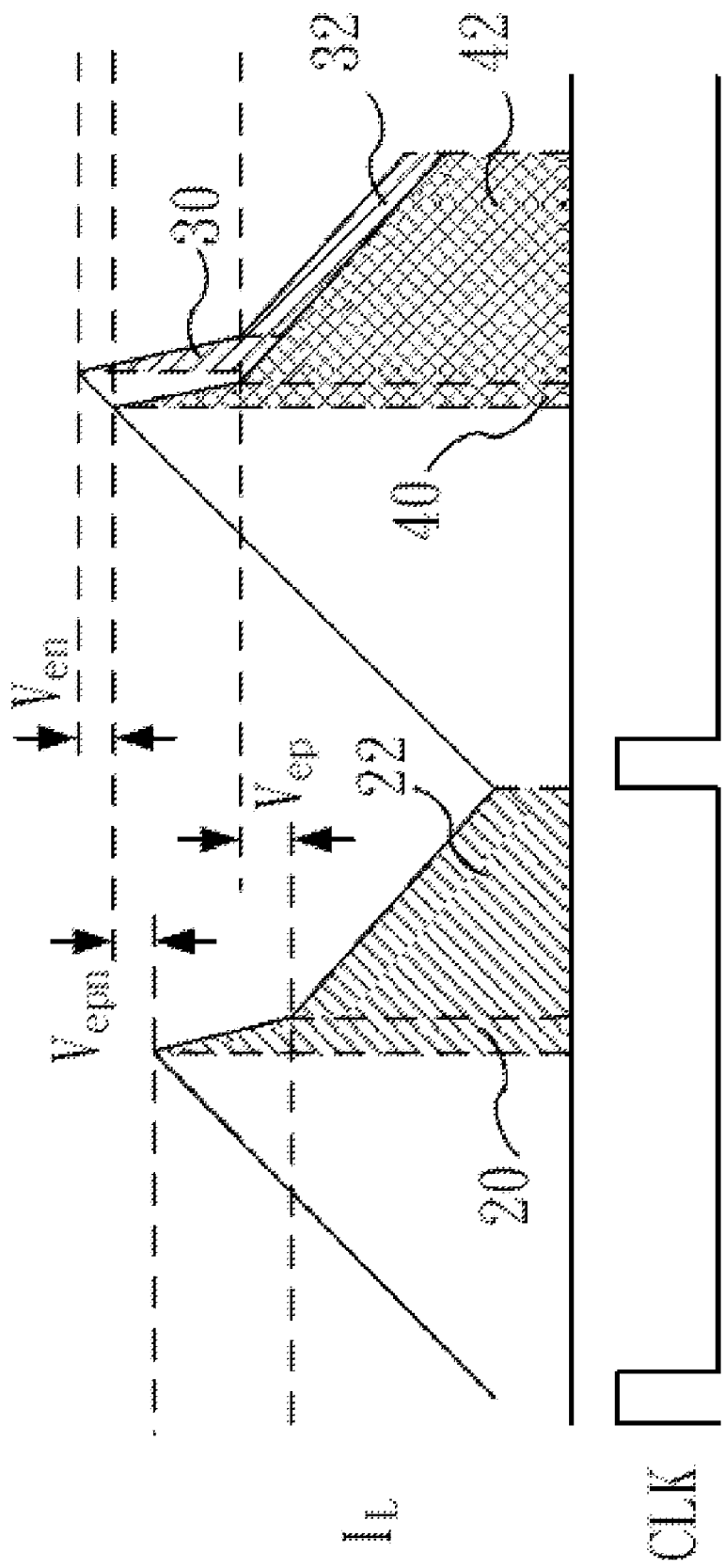
FIG. 3 is a wave form of an inductor charging and discharging cycle according to this invention.
Figure 4A:
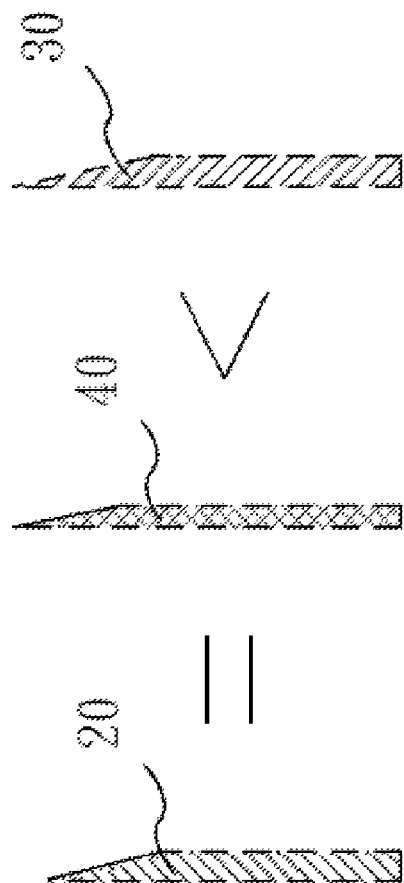
FIG. 4A is a schematic diagram of the negative voltage energy change of the invention.
Figure 4B:
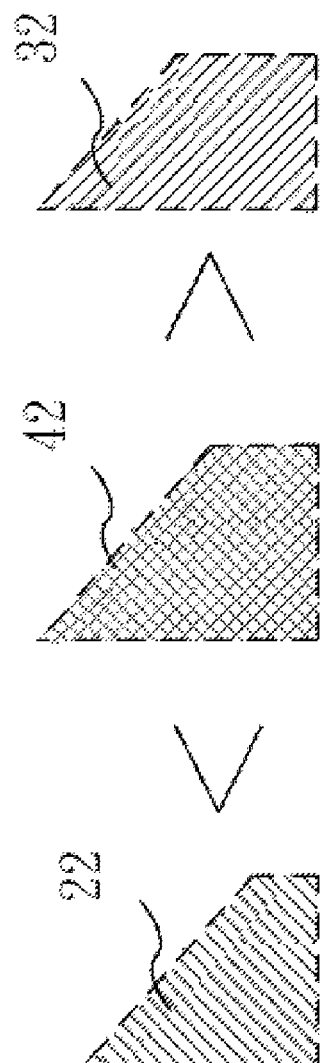
FIG. 4B is a schematic diagram of the positive voltage energy change of the invention.

FIG. 3 shows the wave form diagram of charging and discharging cycle of the inductor of the invention. Please refer to the circuit framework schematic diagram of FIG. 1 and the power control flow chart of FIG. 2 as well as the energy change schematic diagrams of the positive and negative output voltages in FIG. 4A and FIG. 4B; as shown in the Figures, in the steady state the energy of the output voltage includes an negative output voltage energy represented by area 20 and a positive output voltage energy represented by area 22. Consider the situation where the voltage feedback adjustment circuit 58 is not implemented, when the load state of the positive output voltage (Vop) is changed and the load state of the negative output voltage (Von) is unchanged, as the positive output current (Iop) is suddenly increased, the positive output error signal (Vep) is raised, which drives the peak voltage (Vepn) to raise. Therefore, the negative output voltage energy area 20 and the positive output voltage energy area 22 are both increased to become respectively the negative output voltage energy area 30 and the positive output voltage energy area 32. However, as the load state of the negative output voltage (Von) is unchanged, the actual increase of negative output voltage energy from area 20 to area 30 is an actual effect of the cross regulation.

Therefore, the voltage feedback adjustment circuit 58 is used to modulate the positive output voltage error signal (Vep) and the negative output voltage error signal (Ven) when the load state of the positive output voltage (Vop) changes and drives up the positive output current (Iop). With the implementation of the voltage feedback adjustment circuit 58 the level of the positive output voltage error signal (Vep) is raised through the mode of mutual cross feedback to become a positive output voltage error modulating signal (Vemp); meanwhile, the level of the negative output voltage error signal (Ven) is reduced to become a negative output voltage error modulating signal (Vemn). Therefore, the peak voltage (Vepn) can be pulled down to a degree that at the moment the positive output circuit (Iop) changes the negative output voltage energy area 40 equals to the negative output voltage energy area 20 and the positive output voltage energy area 22 is increased to the positive output voltage energy area 42. Therefore, in a same pulse width modulating (PWM) cycle, the energy delivered by the negative output voltage (Von) remains the same as the load state is not changed therefore the output voltage variation due to cross regulation effect is avoid.

The above description explains the effect of load state change of the positive output voltage (Vop) leading to the increase of the positive output current (Iop). The effect on the changes of the load current, the feedback voltage, the error modulating signal and the peak voltage due to various load state changes are summarized in Table (1). The corresponding energy change can be extrapolated according to the change of voltages and currents and is not further elaborated.

TABLE (1)

| Load currents ($I_{op}$, $I_{on}$) | Feedback voltages ($V_{fp}$, $V_{fn}$) | positive error modulating signal ($V_{emp}$) | negative error modulating signal ($V_{emn}$) | Peak voltage ($V_{epn}$) |
|---|---|---|---|---|
| $I_{op}$ ↑ | $V_{fp}$ ↓ | $V_{emp}$ ↑↑ | $V_{emn}$ ↓ | $V_{epn}$ ↑ |
| $I_{op}$ ↓ | $V_{fp}$ ↑ | $V_{emp}$ ↓↓ | $V_{emn}$ ↑ | $V_{epn}$ ↓ |
| $I_{on}$ ↑ | $V_{fn}$ ↑ | $V_{emp}$ ↑ | $V_{emn}$ ↑↑ | $V_{epn}$ ↑↑↑ |
| $I_{on}$ ↓ | $V_{fn}$ ↓ | $V_{emp}$ ↓ | $V_{emn}$ ↓↓ | $V_{epn}$ ↓↓↓ |

It is understood from the illustration of above embodiment that this invention modulates the error signal through a voltage feedback adjustment circuit to predict the energy of output voltage according to the demand of load state. The energy stored in a charging period is accumulated to equal the total energy demanded by the system and by adjusting the charging cycle duty. By adjusting the discharging cycle duty for each output voltage accordingly, the energy of an output voltage delivered to an unchanged load remains the same. The invention greatly reduces the cross regulation effect and improves the output stability and transient response of a single inductor multi-output system. The invention is applicable to various power conversion circuits such as non-isolated Boost, Buck and Buck-boost converter, isolated forward, full-bridge, half-bridge, and push-pull power converter, as well as the combinations of all kinds of converter circuit.

While the above is a complete description of the preferred embodiment of the present invention, that contains many specificities, these specificities should not be constructed as accordingly limiting the scope of the present invention but as merely providing illustrations of numerous presently preferred embodiments of this invention. It is possible to use various alternatives, modifications and equivalents without departing the spirit of the invention. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A power conversion system for reducing cross regulation effect comprises:
   a switching circuit electrically connected to an inductor for controlling the inductor charged and discharged therefore providing a plurality of output voltages;
   a current detector electrically connected to the inductor for detecting an inductor current passing through the inductor and sensing an inductor voltage across the inductor;
   a plurality of error amplifiers electrically connected to the switching circuit for receiving an feed back each of the plurality of output voltages therefore generating an error signal of each the output voltage;
   a voltage feedback adjustment circuit electrically connected to the plurality of error amplifiers for receiving and modulating the error signal of each the output voltage therefore generating a plurality of error modulating signals;
   a peak generator electrically connected to the voltage feedback adjustment circuit for receiving the plurality of error modulating signals therefore generating a peak voltage;
   a comparator unit electrically connected to the voltage feedback adjustment circuit, the peak generator and the current detector for receiving the plurality of error modulating signals, the peak voltage and the inductor voltage, and respectively comparing the inductor voltage with the error modulating signal and the peak voltage to generate a plurality of voltage signals; and
   a control circuit electrically connected to the comparator unit for receiving the plurality of voltage signals and generating a plurality of control signals to control the switching circuit.

2. The power conversion system for reducing cross regulation effect according to claim 1 further comprises:
a slope equalizer electrically connected to the current detector to compensate a second harmonic generation due to the alternation of the inductor current.

3. The power conversion system for reducing cross regulation effect according to claim 1, wherein the error amplifiers amplify the error signal based on a reference voltage.

4. The power conversion system for reducing cross regulation effect according to claim 3 further comprise a band gap reference circuit to generate the reference voltage.

5. The power conversion system for reducing cross regulation effect according to claim 1, wherein the control circuit further comprises a path decision logic and an offset adjustment circuit; wherein the path decision logic receives the plurality of voltage signals and controls the offset adjustment circuit to generate the control signal.

6. The power conversion system for reducing cross regulation effect according to claim 1, wherein the switching circuit further comprises a plurality of switching transistors; whereas the control circuit generates the control signals to control the switching transistors on and off.

7. The power conversion system for reducing cross regulation effect according to claim 1, wherein the peak voltage is a maximum inductor voltage of next inductor charging period.

8. The power conversion system for reducing cross regulation effect according to claim 1, wherein the plurality of output voltages comprise a positive voltage or a negative voltage.

9. The power conversion system for reducing cross regulation effect according to claim 1, wherein the voltage feedback adjustment circuit is integrated into the error amplifier.

10. A power control method for reducing cross regulation effect comprises the following steps:
calculate an error signal of each of a plurality of output voltages;
modulate the error signal of each of a plurality of output voltages to generate a plurality of error modulating signals; and
calculate a peak voltage according to the plurality of error modulating signals and calculate a total energy of a charging period according to the peak voltage.

11. The power conversion method for reducing cross regulation effect according to claim 10, wherein each of the error signals is calculated according to a load state of each of the output voltage.

12. The power conversion method for reducing the cross regulation effect according claim 11, wherein energy of each of the output voltage is adjusted to meet a demand of the respective load state through modulating the corresponding error signal.

13. The power conversion method for reducing cross regulation effect according to claim 12, wherein a total energy of a discharging period is a sum of the energy of each of the output voltage I.

14. The power conversion method for reducing cross regulation effect according to claim 10, wherein the plurality of output voltages comprise a positive voltage or a negative voltage.

15. The power conversion method for reducing cross regulation effect according to claim 10, wherein the peak voltage is a maximum voltage charging an inductor in a next charging period.

16. The power conversion method for reducing cross regulation effect according to claim 10, wherein the total energy of the charging period is a total energy needed by the system.

17. The power conversion method for reducing cross regulation effect according to claim 10 further comprises a step of charging an inductor with the peak voltage;
wherein the inductor stores the total energy of the charging period.

* * * * *